United States Patent
Pav

[11] Patent Number: 5,206,978
[45] Date of Patent: May 4, 1993

[54] HYDROSTATIC ROLL FOR USE IN CALENDERS

[75] Inventor: Josef Pav, Krefeld, Fed. Rep. of Germany

[73] Assignee: Kleinewefers GmbH, Krefeld, Fed. Rep. of Germany

[21] Appl. No.: 763,129

[22] Filed: Sep. 20, 1991

[30] Foreign Application Priority Data

Sep. 27, 1990 [DE] Fed. Rep. of Germany ....... 4030537

[51] Int. Cl.⁵ .................. B21B 31/32; B21B 13/02
[52] U.S. Cl. ................................. 492/7; 492/5; 492/46
[58] Field of Search .................. 29/113.1, 113.2, 116.1, 29/116.2, 895; 72/243, 244, 245; 100/47

[56] References Cited

U.S. PATENT DOCUMENTS

| | | | |
|---|---|---|---|
| 4,373,238 | 2/1983 | Güttinger | 29/116.2 |
| 4,394,793 | 7/1983 | Pav et al. | 29/116.2 |
| 4,625,637 | 12/1986 | Pav | 100/47 |
| 4,757,584 | 7/1988 | Pav | 29/116.1 |
| 4,903,517 | 2/1990 | Van Haag | 72/245 |
| 4,955,120 | 9/1990 | Brendel et al. | 29/113.2 |
| 5,033,176 | 7/1991 | Schiel | 29/113.2 X |
| 5,101,544 | 4/1992 | Kubik | 29/116.2 |

FOREIGN PATENT DOCUMENTS

3813598 11/1989 Fed. Rep. of Germany .
3909556 11/1989 Fed. Rep. of Germany .
4011826 8/1991 Fed. Rep. of Germany .

*Primary Examiner*—Joseph M. Gorski
*Assistant Examiner*—Peter Dungba Vo
*Attorney, Agent, or Firm*—Peter K. Kontler

[57] ABSTRACT

A roll for use in a calender or a like machine has a carrier which is surrounded by a flexible cylindrical shell. One or more hydrostatic displacing units are installed between the carrier and the shell to deform, when necessary, one or more selected portions of the shell. Each displacing unit has a bearing element with an external surface which is closely adjacent the internal surface of the shell and has one or more pockets for reception of a heated pressurized hydraulic fluid. Each bearing element has a second surface which faces away from the external surface, and the respective displacing unit further comprises one or more plenum chambers adjacent the second surface of the bearing element. The pocket or pockets of the bearing element receive heated fluid from a first source, and the plenum chamber or chambers of the bearing element receive compressed oil or another hydraulic fluid from a second source which can include one or more parts of the first source or vice versa. Each plenum chamber can discharge a stream of oil by way of a flow restrictor to thus prevent stagnation and/or overheating of compressed oil therein. The thus discharged oil can be returned to the source of compressed oil.

21 Claims, 2 Drawing Sheets

HYDROSTATIC ROLL FOR USE IN CALENDERS

BACKGROUND OF THE INVENTION

The invention relates to calenders and like machines in general, and more particularly to improvements in roll assemblies for use in such machines. Still more particularly, the invention relates to improvements in rolls which can be used in roll assemblies of calenders and like machines and wherein a deformable hollow cylindrical shell surrounds a fixed carrier and can be deformed by one or more hydrostatic displacing units which are installed between the carrier and the internal surface of the shell.

It is often necessary to heat the shell of a roll wherein the shell can be deformed by one or more hydrostatic displacing units. This is achieved in that a heated hydraulic fluid is supplied to the pocket or pockets of the hydrostatic bearing element or elements of the displacing unit or units and that a compressed hydraulic fluid is admitted into the plenum chamber or chambers of that bearing element or of those bearing elements which are to be moved radially outwardly away from the carrier in order to deform the adjacent portion or portions of the shell.

German patent application No. 39 09 556 of Link (published Nov. 16, 1989) discloses a roll wherein the pockets of the bearing elements in the hydrostatic displacing units receive streams of heated liquid at a constant volumetric rate. The heated liquid flows through one or more flow restrictors on its way into the pockets of the bearing elements and is maintained at a selected temperature. The pressure of heated liquid is limited due to the design of the pump which is used to force heated liquid into the pockets. A basically independent or discrete second hydraulic circuit is provided to deliver compressed liquid into the plenum chamber or chambers of one or more displacing units in order to bring about deformation of the corresponding portion or portions of the shell. The pressure of liquid which is admitted into the plenum chamber or chambers is selected by a variable-pressure pump or by a pressure regulating valve which is installed downstream of a constant-pressure pump. A bypass line branches off the conduit which delivers compressed liquid to the plenum chamber or chambers, and the outlet of the bypass line admits compressed liquid into the sump from which the pump draws a stream for liquid for introduction into the plenum chamber or chambers. A drawback of such proposal is that the plenum chamber or chambers confine stagnant bodies of compressed liquid. This can lead to overheating and decomposition of the confined liquid and results in contamination of the plenum chambers.

German patent application No. 38 13 598 of Kubik et al. (published Nov. 23, 1989) discloses a roll wherein the plenum chambers of the hydrostatic displacing units are sealed from the interior of the shell as well as from the pockets in the external surface of the respective bearing elements. This also leads to overheating of liquid in the plenum chambers.

OBJECTS OF THE INVENTION

An object of the invention is to provide a roll wherein the compressed fluid which serves to urge the bearing elements of the hydrostatic displacing units against the internal surface of the shell is less likely to be overheated than in heretofore known rolls.

Another object of the invention is to provide a roll wherein the fluid which fills the plenum chambers of the hydrostatic displacing units is less likely to be decomposed as a result of heating and/or stagnation than in heretofore known rolls.

A further object of the invention is to provide a roll wherein the shell can be heated to elevated temperatures without the danger of overheating the compressed fluid in the plenum chambers of the hydrostatic displacing units.

An additional object of the invention is to provide a roll assembly which employs one or more rolls of the above outlined character.

Still another object of the invention is to provide a calender or a like machine which embodies one or more rolls of the above outlined character.

A further object of the invention is to provide a novel and improved method of preventing stagnation of compressed fluid in the plenum chambers of hydrostatic displacing units of the above outlined roll.

An additional object of the invention is to provide a roll which is less prone to malfunction, even when its shell is heated to an elevated temperature, than heretofore known rolls.

A further object of the invention is to provide novel and improved hydrostatic displacing units for use in the above outlined roll.

Another object of the invention is to provide novel and improved hydraulic circuits for the hydrostatic displacing units which can be utilized in the above outlined roll.

An additional object of the invention is to provide novel and improved means for heating the shell of a roll in a calender or a like machine.

SUMMARY OF THE INVENTION

The invention is embodied in a roll which can be used in calenders and like machines The improved roll comprises a carrier which can be fixedly mounted in the frame of a calender, a flexible rotary cylindrical shell which spacedly surrounds the carrier, and at least one hydrostatic displacing unit which is disposed between the carrier and the shell and comprises a bearing element having an external surface which is adjacent the internal surface of the shell and has at least one pocket. The bearing element further includes a second surface which faces away from the external surface, and the displacing unit further comprises at least one plenum chamber at the second surface, a source of pressurized heated fluid, means for supplying heated fluid from the source to the at least one pocket, a source of compressed fluid, means for conveying compressed fluid from the respective source to the at least one plenum chamber, and a flow restrictor which defines a path for evacuation of compressed fluid from the at least one plenum chamber.

The displacing unit can further comprise a fluid pressure regulator which is provided in the conveying means and is operative to regulate the pressure of compressed fluid in the at least one plenum chamber. The pressure of all of the compressed fluid which is conveyed from the respective source to the at least one plenum chamber can be regulated by the fluid pressure regulator.

The flow restrictor can include or constitute a nonadjustable flow restrictor, e.g., a channel or a similar passage which is provided in the carrier and has a predetermined minimum cross-sectional area to throttle the flow of compressed fluid from the at least one plenum chamber.

Alternatively, the flow restrictor can comprise a pressure regulator which regulates the pressure of compressed fluid in the at least one plenum chamber by regulating the rate of outflow of compressed fluid from such chamber.

The at least one displacing unit can further comprise means for cooling the fluid in the conveying means and/or means for delivering fluid from the flow restrictor to the source of compressed fluid. At least some of the heated fluid leaks from the at least one pocket by flowing between the internal surface of the shell and the external surface of the bearing element into the interior of the shell, and the at least one unit can further comprise discrete second means for delivering leak fluid from the interior of the shell to the source of heated fluid.

Each of the two sources can include a discrete fluid storing vessel and a pump which draws fluid from the respective vessel.

Thermal oil can be used as heated fluid, and another oil can be used as compressed fluid.

In accordance with a presently preferred embodiment, the source of heated fluid comprises a vessel and a pump which draws fluid from the vessel. The supplying means of such displacing unit can comprise a first conduit which delivers fluid from the pump to the at least one pocket, and the source of heated fluid can further comprise a heater in the first conduit. The source of compressed fluid in such displacing unit can comprise a second conduit which branches off the first conduit upstream of the heater, and such displacing unit can further comprise a third conduit which delivers fluid from the flow restrictor to the vessel.

The external surface as well as the second surface of the bearing element extends circumferentially and axially of the shell. The configuration of these surfaces is preferably such that each thereof has a first length axially of the shell and a greater second length circumferentially of the shell.

The conveying means has an outlet which admits compressed fluid to the at least one plenum chamber, and the flow restrictor has an inlet which receives fluid from the at least one plenum chamber and is preferably remote from the outlet of the conveying means. For example, the at least one plenum chamber can include a plurality of communicatively connected compartments, the outlet of the conveying means communicates with one of these compartments, and the inlet of the flow restrictor communicates with another compartment of such plenum chamber.

The at least one displacing unit can further comprise at least one fluid flow regulator in the at least one plenum chamber. Such at least one fluid flow regulator can include at least one nozzle which receives compressed fluid from the conveying means and has one or more orifices which direct compressed fluid in one or more predetermined directions in the interior of the at least one plenum chamber.

The at least one plenum chamber can comprise a first portion in the bearing element and a second portion in the carrier. The flow restrictor can be provided in the carrier. To this end, the second portion of the at least one plenum chamber can be provided with at least one exposed side in the interior of the shell, and the flow restrictor can have an outlet in such exposed side. An evacuating conduit can be provided to receive fluid from the outlet of the flow restrictor.

The novel features which are considered as characteristic of the invention are set forth in particular in the appended claims. The improved roll itself, however, both as to its construction and the mode of using the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
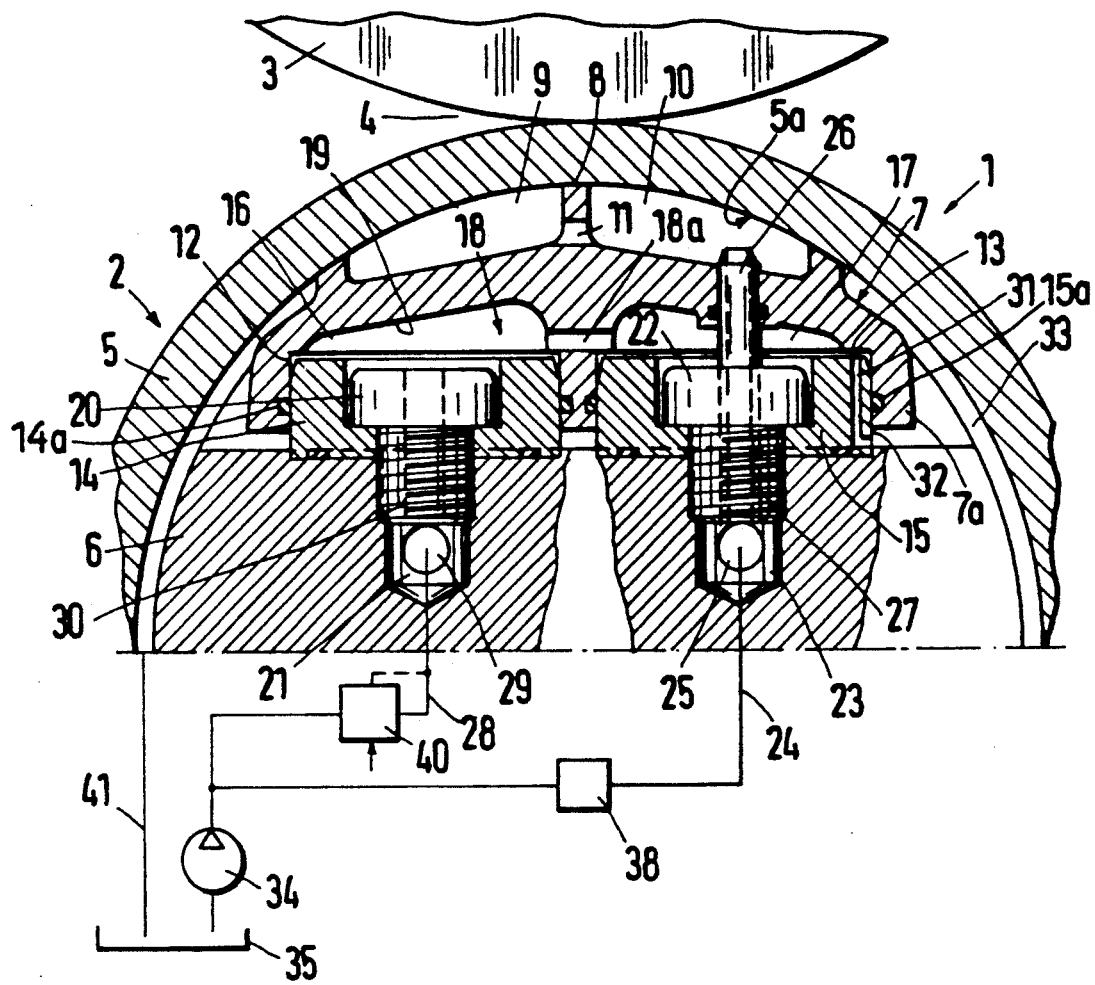
FIG. 1 is a fragmentary partly diagrammatic and partly transverse vertical sectional view of a roll assembly including a roll having one or more hydrostatic displacing units which are constructed and assembled in accordance with a first embodiment of the invention.

FIG. 1 shows a portion of a roll assembly 1 which can be used in a calender, e.g., a calender of the type described and shown in commonly owned U.S. Pat. No. 4,625,637 granted Dec. 2, 1986 to Pav et al. for "Roll assembly for use in calenders and the like" or in commonly owned U.S. Pat. No. 4,903,517 granted Feb. 27, 1990 to Van Haag et al. for "Method of and apparatus for regulating the operation of calenders and like machines". The roll assembly 1 comprises a first roll 2 which includes a heatable and deformable hollow cylindrical shell 5, and a second roll 3 which defines with the shell 5 an elongated nip 4 for the passage of a running web of paper, foil, textile or other sheet or strip material. The shell 5 spacedly surrounds a carrier 6 which is fixedly installed in the frame of the machine so that it cannot rotate with the shell.

The means for deforming and heating selected portions of the shell 5 comprises at least one row of closely adjacent hydrostatic displacing units 7 (only one shown) which operate between the internal surface 5a of the shell 5 and the carrier 6 and each of which comprises at least one bearing element 7a. The internal space 33 of the shell 5 can accommodate two or more axially parallel rows of hydrostatic displacing elements. Reference may be had to the aforementioned commonly owned U.S. Pats. to Pav et al. and Van Haag et al.

Figure 2:
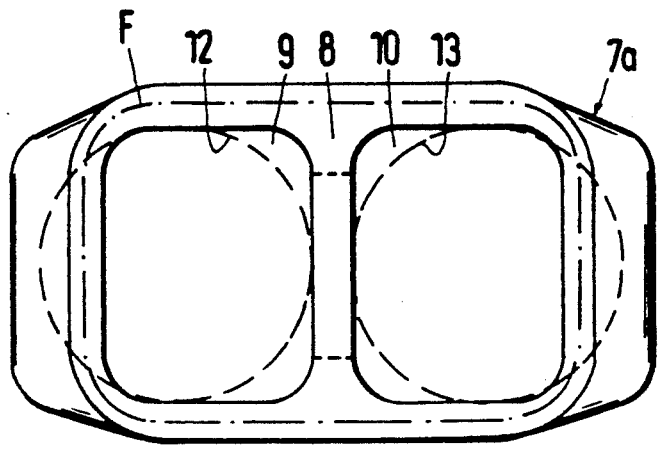
FIG. 2 is a plan view of a bearing element which forms part of a hydrostatic displacing unit in the roll of FIG. 1.

FIGS. 1 and 2 show that the illustrated bearing element 7a has a convex external surface 8 which is closely adjacent the complementary concave internal surface 5a of the shell 5 and is formed with two pockets 9, 10 for reception of a heated pressurized fluid, e.g., thermal oil. The ridge between the pockets 9 and 10 is formed with one or more channels 11 which enable the heated fluid to flow from the pocket 10 into the pocket 9 and/or vice versa. The external surface 8 is relatively long in the circumferential direction and relatively short in the axial direction of the shell 5. The pressure effective portion F of the external surface 8 of the bearing element 7a is indicated by a phantom line. The actual force which the bearing element 7a can apply to the adjacent portion of the internal surface 5a of the shell 5 is the product of the area of the surface portion F and the pressure in the pockets 9 and 10.

The hydrostatic displacing unit 7 further comprises two cylinder chambers 12, 13 at a second surface 19 of the bearing element 7a, namely a surface which faces away from the external surface 8 and toward the adjacent portion of the carrier 6. The cylinder chambers 12, 13 respectively receive pistons 14, 15 which are affixed to the carrier 6. The cylinder chambers 12, 13 form part of a plenum chamber 18 which is adjacent the surface 19 and receives compressed fluid (e.g., oil or another lubricant) when the illustrated displacing unit 7 is to exert pressure against the adjacent portion of the internal surface 5a of the shell 5. The plenum chamber 18 has two compartments 16, 17 which are radially inwardly adjacent the respective pockets 9, 10 and are communicatively connected to each other by one or more channels or passages 18a radially inwardly of the channel or channels 11.

The pressure effective portion F of the external surface 8 includes the bottom surfaces in the pockets 9, 10, the surface of the ridge between these pockets, and approximately half the surface of the rim bounding the pockets 9 and 10. The effective portion of the second surface 19 can equal or approximate the portion F of the external surface 8. The length of the effective portion of the second surface 19 of the bearing element 7a in the circumferential direction of the shell 5 exceeds (normally considerably, see FIG. 2) the length of such effective portion of the surface 19 in the axial direction of the shell. FIG. 2 shows that the projections of left-hand portion of the cylinder chamber 12 for the piston 14 and of the right-hand portion of the cylinder chamber 13 for the piston 15 onto the surface 19 extend circumferentially of the shell 5 beyond the pressure effective portion F of the external surface 8 of the bearing element 7a.

The piston 14 is affixed to the carrier 6 by a screw 20 or another suitable fastener, and a screw 22 is utilized to affix the piston 15 to the carrier 6. The shank of the screw 20 extends into a tapped bore 21 and the shank of the screw 22 extends into a tapped bore 23 of the carrier 6. That portion of the tapped bore 21 which is not filled by the shank of the screw 20 can be said to constitute a portion the plenum chamber 18 in the carrier 6, and the compartments 16, 17 can be said to constitute that portion of the plenum chamber 18 which is provided in the bearing element 7a and is adjacent the second surface 19.

The source of heated fluid includes a vessel 35, a pump 34 which draws fluid from the vessel 35, and a heater 38 of any suitable design (e.g., an electric heater or a heat exchanger) which is installed in a conduit 24 serving as a means for supplying heated pressurized fluid from the source to the pockets 9, 10. The fluid supplying means further comprises the innermost portion of the tapped bore 23, a channel 25 which connects the conduit 24 with the bore 23, and a tube 26 which is installed in the screw 22 and has an axial passage 27 extending from the radially innermost portion of the bore 23 to the pocket 10. The latter admits heated pressurized fluid into the pocket 9 by way of the channel 11.

The conduit 24 can serve as a component part of means for supplying pressurized heated fluid from the source 34, 35, 38 to the pockets of two or more bearing elements 7a, e.g., to a set of two or three neighboring bearing elements. The channel 25 preferably extends in parallelism with the axis of the shell 5 and is machined into or otherwise formed in the carrier 6. Reference may be had, for example, to commonly owned U.S. Pat. No. 4,757,584 granted Jul 19, 1988 to Pav et al. for "Roll for use in calenders and the like".

The tube 26 can form an integral part of the screw 22 or it can be welded or otherwise affixed to the head of the screw 22. All that counts is to provide means for supplying heated pressurized fluid from the source 34, 35, 38 to the pockets 9, 10 of the bearing element 7a. Some of the fluid which is forced into the pockets 9 and 10 leaks between the internal surface 5a of the shell 5 and the external surface 8 of the bearing element 7a to gather in the internal space 33 of the shell and to be delivered to the vessel 35 (i.e., to the source of pressurized heated fluid) by a conduit 41. It will be noted that the roll 2 and its displacing unit 7 do not comprise any means for throttling the flow of heated pressurized fluid into the pockets 9 and 10.

In the hydrostatic displacing unit 7 of FIGS. 1 and 2, the source of pressurized hydraulic fluid which is being admitted into the plenum chamber 18, when the need arises to bias the bearing element 7a against the shell 5, comprises a conduit 28 which branches off the fluid supplying conduit 24 upstream of the heater 38. The pump 34 and the vessel 35 can be said to form part of the source of pressurized heated fluid which is to be admitted into the pockets 9, 10 and to simultaneously form part of the source of pressurized fluid which is to be admitted into the plenum chamber 18. The conduit 28 can be used to convey pressurized hydraulic fluid to the plenum chambers of two or more hydrostatic displacing units.

The means for conveying pressurized fluid from the source 34, 35 28 to the plenum chamber 18 of the illustrated hydrostatic displacing unit 7 comprises a channel or bore 29 which is provided in the carrier 6 (preferably in parallelism with the channel or bore 25) and delivers pressurized fluid from the conduit 28 into the radially innermost portion of the tapped bore 21. The screw 20 has an axial passage or bore 30 which establishes communication between the channel 29 and the compartment 16 of the plenum chamber 18. The thus admitted compressed fluid is free to fill the compartment 17 because the latter communicates with the compartment 16 by way of the aforementioned channel or channels 18a.

In accordance with a feature of the invention, the hydrostatic displacing unit 7 comprises a flow restrictor which defines a path for evacuation of pressurized fluid from the plenum chamber 18. The flow restrictor in the displacing unit 7 of FIG. 1 is a channel 31 which is machined into or is otherwise formed in the piston 15 (i.e., in the carrier 6 because the pistons 14, 15 can be considered to constitute component parts of the carrier) and has an inlet (at its upper end, as viewed in FIG. 1) which is remote from the outlet (upper end) of the axial passage or bore 30 in the screw 20. Thus, that portion of pressurized fluid which enters the plenum chamber 18 (namely the compartment 16) and is to be evacuated via flow restrictor 31 must cover a considerable distance by flowing from the outlet of the bore 30, through the compartment 16, through the channel or channels 18a, and through the compartment 17. The outlet of the flow restrictor 31 is disposed in an exposed side or surface 32 of the carrier 6 and more specifically in an exposed side of the piston 15. The fluid which is discharged by the flow restrictor 31 enters the internal space 33 of the shell 5 and is delivered to the vessel 35 via conduit 41. It will be noted that the flow restrictor 31 which is shown in FIG. 1 is a fixed (i.e., non-adjustable) flow restrictor.

If desired or more convenient, the piston 15 can be provided with a relatively large bore or hole which extends from the compartment 17 of the plenum chamber 18 to the exposed side 32 and contains a throttling insert to ensure that the rate of flow of fluid from the compartment 17 into the internal space 33 will match or approximate a desired value which is best suited to ensure adequate circulation of pressurized fluid from the vessel 35, into the plenum chamber 19, thence into the internal space 33 of the shell 5, and through the fluid delivering conduit 41 back into the vessel 35.

The placing of the outlet of the bore 30 at a considerable distance from the inlet of the flow restrictor 31 is desirable and advantageous because this ensures that pressurized fluid is in motion in all or practically all sections of the plenum chamber 18 to thus prevent stagnation of pressurized fluid in one or more dead corners which could result in overheating and decomposition of such fluid with attendant contamination of the plenum chamber.

When the hydrostatic displacing unit 7 of FIGS. 1 and 2 is in use, the volumetric pump 34 draws hydraulic fluid from the vessel 35 and delivers compressed fluid into the conduit 28 and hence also into the conduit 28. That stream of fluid which is admitted into the supplying conduit 24 is heated by the heater 38 and is thereupon admitted into the pocket 10 through the channel 25, bore 23 and axial passage 27 of the tube 26. The fluid stream which is admitted into the conduit 28 passes through a fluid pressure regulator 40 prior to entering the channel 29, i.e., the entire flow of fluid which is on its way toward and into the plenum chamber 18 must pass through the pressure regulator 40. The latter is adjustable so that it can select the pressure of fluid which enters the plenum chamber 18 and bears upon the surface 19 to urge the external surface 8 of the bearing element 7a against the adjacent portion of the internal surface 5a of the shell 5.

The pump 35 is preferably set up in such a way that it supplies hydraulic fluid to the pockets 9 and 10 at a constant volumetric rate even though a stream of pressurized fluid is branched off to flow into and through the conduit 28 on its way into the plenum chamber 18. This ensures that the pressure of heated fluid in the pockets 9 and 10 is automatically selected with a view to ensure the transmission of a requisite force between the effective portion F of the external surface 8 and the internal surface 5a.

As a rule, or at least in many instances, the quantity of fluid which is branched off the fluid stream in the conduit 24 to flow through the conduit 28 and into the plenum chamber 18 is relatively small (as compared with the quantity of fluid in the main stream flowing through the heater 38 and into the pockets 9 and 10). Therefore, it is not always necessary to resort to volumetric regulation of fluid which is discharged by the pump 35.

Heated fluid which leaks between the surfaces 5a and 8 and gathers in the internal space 33 of the shell 5 is free to mix with the fluid which is discharged by the flow restrictor 31 so that a single conduit 41 suffices to deliver the mixture from the internal space 33 back into the vessel 35.

An important feature of the invention is based on the discovery that complete or practically complete stagnation of compressed fluid in the plenum chamber of a conventional hydrostatic displacing unit is undesirable and can adversely affect the operation of the displacing unit. Thus, if the compressed fluid which is admitted into the plenum chamber of a conventional displacing unit contains solid contaminants (e.g., particles which are formed as a result of partial decomposition of the fluid and/or other solid particles), such particles are likely or bound to gather in the plenum chamber, in the cylinder chamber or chambers and/or on the piston or pistons. These solid particles are likely to attack and to cause premature destruction of sealing elements (such as 14a and 15a) and/or to affect the accuracy of adjustment of the bearing element relative to the carrier.

Another drawback of conventional hydrostatic displacing units wherein the compressed fluid is free to stagnate in the plenum chamber is that the confined fluid is likely to be overheated by the bearing element which, in turn, is heated by fluid in its pocket or pockets. Overheating of compressed fluid in the plenum chamber is likely to have an adverse effect upon the accuracy of flexure or displacement of the corresponding portion of the shell. Furthermore, and if the fluid in the plenum chamber is standard hydraulic oil, and if the temperature of such fluid reaches or exceeds a certain threshold value, the fluid is bound to decompose and the sediments which are produced as a result of such decomposition will attack the sealing elements, clog the paths for the flow of compressed fluid and/or otherwise adversely affect the operation of the displacing unit.

All this is avoided by the novel expedient of providing a flow restrictor 31 which establishes a path for evacuation of a certain quantity of compressed fluid from the plenum chamber 18 so that the fluid in the plenum chamber 18 is in continuous motion and is highly unlikely to be overheated. Moreover, and even if the fluid carries a certain percentage of solid contaminants, such contaminants are much less likely to deposit in the plenum chamber 18 and to affect the operation of the displacing unit 7. It has been found that the throttling action of the flow restrictor 31 and the rate of delivery of pressurized fluid by the pump 34 into the conduit 28 can be readily selected in such a way that the temperature of fluid in the plenum chamber 18 cannot reach a threshold value at which the fluid is likely to decompose and produce sediments which could affect the operation of the displacing unit.

Another advantage of the improved roll and of its hydrostatic displacing unit or units is that the bypass conduit which is shown at 17 in FIG. 1 of the aforementioned published German patent application No. 39 09 556 of Link can be omitted, i.e., it is not necessary to branch off a certain percentage of compressed fluid from the conduit 28 upstream of the plenum chamber 18.

The fluid pressure regulator 40 suffices to regulate the pressure of fluid in the plenum chamber 18 of the illustrated displacing unit 7 or in the plenum chambers of a group of two or more displacing units.

The simple and inexpensive flow restrictor 31 contributes significantly to lower initial, assembly and maintenance cost of the roll 2. This is due to the fact that such flow restrictor replaces the bypass conduit of Link and the throttle which is provided in the bypass conduit. The hydraulic circuit of the improved displacing unit is simple and inexpensive in spite of the fact that the flow restrictor 31 compels the fluid to circulate along a path having a portion extending through the plenum chamber 18.

As a rule, the range of adjustments of fluid pressure in the plenum chamber 18 is relatively narrow. Therefore, a fixed flow restrictor 31 often suffices to ensure a desirable rate of fluid circulation through the plenum chamber. However, and as will be described with reference to FIGS. 3 and 4, it is equally within the purview of the invention to employ an adjustable flow restrictor which renders it possible to conform the rate of circulation of fluid through the plenum chamber or chambers to the prevailing operating conditions.

The fact that the fluid which is pumped into the pockets 9 and 10 is the same as the fluid which is pumped into the plenum chamber 18 does not adversely influence the operation of the displacing units in many types of flexible and heatable rolls for use in calenders and like machines. A reason is that it is possible to ensure desirable heating of the fluid which is admitted into the pockets 9, 10 without any direct heating of the fluid which is to enter the plenum chamber 18. The heater 38 is or can be adjustable or can comprise a battery of two or more discrete heaters each of which can be turned on or off independently of the other discrete heater or heaters.

An advantage of surfaces 8 and 19 which extend primarily in the circumferential direction of the shell 5, i.e., which are relatively short as seen in the axial direction but are relatively long in the circumferential direction of the shell, is that such surfaces can ensure the generation of requisite forces to act upon the internal surface 5a of the shell 5 even if the pressure of fluid in the plenum chamber 18 is relatively low. If the pressure of the fluid is relatively low, the displacing unit can operate with a fluid which is heated to an elevated temperature because this does not affect the operation of the pump as long as the pump need not deliver fluid at an elevated pressure Moreover, and since the fluid which enters the compartment 16 of the plenum chamber 18 is compelled to flow through the channel or channels 18a and through the compartment 17 on its way toward and into the inlet of the flow restrictor 31, overheating of such fluid is not likely even if the fluid is of the type which trends to decompose at a relatively low temperature.

It is possible to provide the flow restrictor 31 in the mobile part of the displacing unit 7, i.e., in the bearing element 7a, , or to provide a plurality of flow restrictors including one in the carrier 6 (or in a part which is rigid with the carrier) and another in the bearing element 7a. It is presently preferred to provide one or more flow restrictors 31 in the stationary part of the displacing unit 7, i.e., to establish a path for evacuation of fluid from that portion of the plenum chamber 18 which is provided in the carrier 6. The placing of the outlet of the flow restrictor 31 at the exposed side 32 of the carrier 6 exhibits the advantage that the outlet is not likely to be obstructed. Moreover, and as shown in FIG. 1, the flow restrictor 31 can be provided in a separately produced part (piston 15) which is affixed to the carrier 6 so that the main portion of this carrier need not be weakened by additional drilled holes or the like. Furthermore, it is simpler to provide the flow restrictor 31 in a detachable part (piston 15) of the carrier 6.

Figure 3:
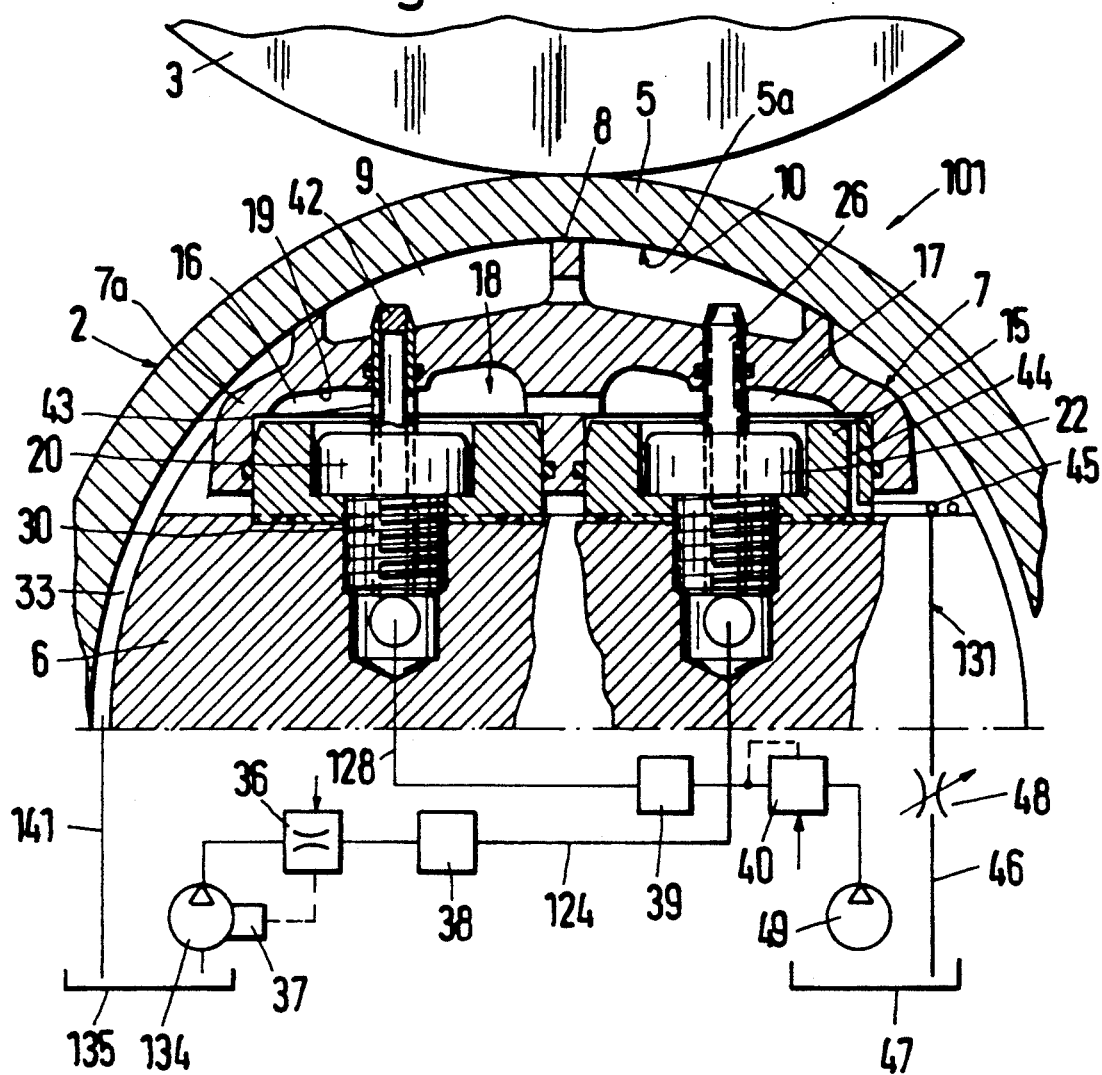
FIG. 3 is a partly diagrammatic and partly transverse vertical sectional view of a roll assembly including a roll having one or more hydrostatic displacing units which are constructed and assembled in accordance with a second embodiment of the invention.

Those component parts of the roll 2 in the roll assembly 101 of FIG. 3 which are identical with or clearly analogous to corresponding parts of the roll assembly 1 are denoted by similar reference characters. The hydrostatic displacing unit 7 of the roll 2 which is shown in FIG. 3 further includes a fluid flow regulator 42 which is a nozzle receiving compressed fluid from the axial passage in the screw 20 and having one or more orifices 43 which direct pressurized fluid into selected portions of the compartment 16 of the plenum chamber 18, particularly into dead corners (if any). The illustrated orifices 43 are radial ports which disperse the supplied compressed fluid in several directions.

The means for conveying compressed fluid from the respective source (including a discrete vessel 47 and a discrete pump 49) includes a conduit 128 which contains a preferably adjustable fluid pressure regulator 40 and a suitable cooling device 39, e.g., a heat exchanger.

The flow restrictor 131 of the displacing unit 7 which is shown in FIG. 3 includes a bore or channel 44 in the piston 15, an outlet 45 which receives fluid from the channel 44, an adjustable throttle 48 in the outlet 45, and an evacuating conduit 46 which delivers fluid back into the vessel 47. The conduit 46 is or can be located externally of the roll 2 (reference may be had to the aforementioned commonly owned U.S. Pat. No. 4,757,584 to Pav et al.).

The source of heated pressurized fluid comprises a discrete vessel 135 and a discrete pump 134 which admits pressurized fluid into a fluid supplying conduit 124. The latter contains a heater 38 and delivers heated pressurized fluid to the tube 26 for admission into the pockets 9 and 10 in the external surface 8 of the bearing element 7a. The pump 135 is equipped with a regulator 37 which receives signals from a fluid flow measuring device 36 of any known design to ensure that the pockets 9, 10 receive predetermined quantities of heated pressurized fluid per unit of time.

The vessel 135 can contain a supply of thermal oil, and the vessel 47 can contain a supply of hydraulic oil other than thermal oil. The modified flow restrictor 131 of FIG. 3 ensures that hydraulic fluid which is caused to flow through the plenum chamber 18 cannot mix with thermal oil which leaks between the shell 5 and the bearing element 7a and is collected in the internal space of the shell to be delivered to the vessel 135 by a conduit 141. An advantage of the hydrostatic displacing unit 7 of FIG. 3 is that thermal oil cannot mix with hydraulic fluid which is caused to circulate through the plenum chamber 18. Therefore, thermal oil can be heated to an elevated temperature without unduly raising the temperature of hydraulic oil. This holds true even if the pressure effective portion of the surface 19 is smaller than the pressure effective portion of the external surface 8, i.e., if the pressure of fluid in the plenum chamber 18 is higher than the pressure of fluid in the pockets 9 and 10.

The cooling device 39 constitutes an optional but desirable feature of the displacing unit 7 of FIG. 3. This cooling device prevents overheating of hydraulic fluid which flows through the plenum chamber 18 even when the hydraulic fluid is repeatedly and frequently circulated along the endless path extending from the vessel 47, through the conduit 128, plenum chamber 18 and flow restrictor 131. In addition, the cooling device 39 withdraws sufficient quantities of heat to ensure that hydraulic fluid which is circulated through the plenum chamber 18 can be subjected to more pronounced thermal stresses and can undergo a more pronounced pressurizing action.

Another advantage of the feature that thermal oil and hydraulic oil are caused to circulate along discrete endless paths is that thermal oil is not unduly cooled on its way from the pockets 9, 10 to the vessel 135, i.e., the heater 38 is merely called upon to raise the temperature of thermal oil which is already maintained at an elevated temperature during flow from the outlet of the pump 134. Furthermore, and since the oil which leaks between the internal surface 5a of the shell 5 and the external surface 8 of the bearing element 7a remains hot (it is not permitted to mix with hydraulic oil which leaves the plenum chamber 18 via bore or bores 44), such oil can continue to heat the shell 5 while being collected in the internal space 33.

A further advantage of the hydrostatic displacing unit 7 of FIG. 3 is that it is possible to select (at 40 and/or at 48) an optimum pressure for hydraulic oil and to select an optimum temperature (at 38) for thermal oil. At the same time, and as already mentioned above, thermal oil cannot unduly influence the hydraulic oil and vice versa.

Figure 4:
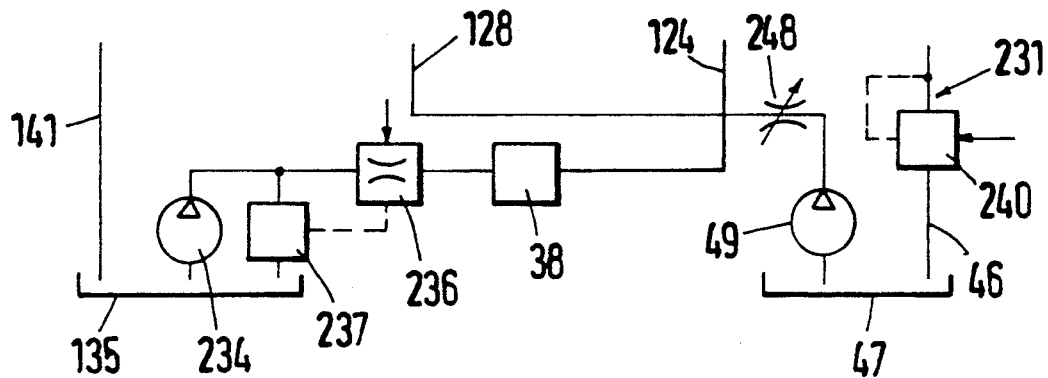
FIG. 4 is a hydraulic circuit diagram of a roll having a hydrostatic displacing unit which is constructed and assembled in accordance with a third embodiment of the invention.

FIG. 4 shows portions of the hydraulic circuits for a heated pressurized fluid (e.g., thermal oil) and a compressed fluid (e.g., hydraulic oil other than thermal oil) in a further hydrostatic displacing unit. All such parts of these circuits which are identical with or clearly analogous to the corresponding parts of the circuits which are shown in FIG. 3 are denoted by similar reference characters plus 100. The source of thermal oil includes the vessel 135 and a volumetric pump 234 which is designed to draw thermal oil at a constant rate. In order to regulate the rate of fluid flow in the supplying conduit 124, the latter contains a flow metering device 236 which controls an adjustable relief valve 237. The fluid flow measuring device 236 is located upstream of the heater 38 in the fluid supplying conduit 124.

The source of compressed fluid (e.g., hydraulic oil) comprises a discrete vessel 47 and a constant delivery pump 49. The fluid conveying conduit 128 contains an adjustable throttle 248, and the fluid delivering conduit 46 contains a flow restrictor 231 in the form of a preferably adjustable pressure regulator 240. It will be noted that the parts 40, 48 in the embodiment of FIG. 3 have switched positions, i.e., the throttle 248 is located downstream and the pressure regulator 240 of the flow restrictor 231 is located upstream of the pump 49. Placing of the pressure regulator 240 upstream of the pump 49 is possible because the hydrostatic displacing unit which embodies the structure of FIG. 4 includes a discrete conduit 46 for delivery of hydraulic oil from the plenum chamber (not shown in FIG. 4) to the respective vessel 47.

The embodiments of FIGS. 3 and 4 exhibit the advantage that hydraulic oil and thermal oil are circulated along separate paths. This is often desirable and advantageous because hydraulic oil is much less expensive than thermal oil. Nevertheless, hydraulic oil in its discrete circuit is adequately shielded from overheating by thermal oil.

The improved roll is susceptible of many additional modifications without departing from the spirit of the invention. For example, the constant delivery volumetric pump 34 of the displacing unit 7 which is shown in FIG. 1 can be replaced with an adjustable pump, such as the pump 134 of the displacing unit which is shown in FIG. 3. In addition, it is possible to employ a pump (e.g., a variable-RPM pump) which is simpler than the pump 134 of FIG. 3, e.g., a pump which can be caused to deliver fluid at the one or the other of only two different rates. The same result can be achieved by employing, for example, two or three or another small number of pumps each of which is designed to deliver fluid at a different rate and each of which can be operated independently of the other pump or pumps.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A roll comprising a carrier; a flexible rotary cylindrical shell spacedly surrounding said carrier and having an internal surface; and at least one hydrostatic displacing unit disposed between said carrier and said shell, said at least one unit comprising a bearing element having an external surface adjacent said internal surface and provided with at least one pocket, said element further having a second surface facing away from said external surface and said unit further comprising at least one plenum chamber at said second surface, a source of pressurized heated fluid, means for supplying heated fluid from said source to said at least one pocket, a source of compressed fluid, and means for effecting the flow of fluid through said at least one plenum chamber including means for conveying compressed fluid from the respective source to said at least one plenum chamber and a flow restrictor defining a path for evacuation of compressed fluid from said at least one plenum chamber.

2. The roll of claim 1, wherein said at least one unit further comprises a fluid pressure regulator operative to regulate the pressure of compressed fluid which is being conveyed to said at least one plenum chamber, the pressure of all of the compressed fluid which is conveyed from the respective source to said at least one plenum chamber being regulated by said fluid pressure regulator.

3. The roll of claim 1, wherein said flow restrictor is a non-adjustable flow restrictor.

4. The roll of claim 1, wherein said flow restrictor comprises a pressure regulator which regulates the pressure of compressed fluid in said at least one plenum chamber.

5. The roll of claim 1, wherein said at least one unit further comprises means for cooling the fluid in said conveying means.

6. The roll of claim 1, wherein said at least one unit further comprises means for delivering fluid from said flow restrictor to the source of compressed fluid.

7. The roll of claim 6, wherein some of the heated fluid leaks from said at least one pocket between said internal and external surfaces into said shell, said at least one unit further comprising discrete second means for delivering fluid from said shell to the source of heated fluid.

8. The roll of claim 1, wherein each of said sources includes a discrete fluid storing vessel and a pump which draws fluid from the respective vessel.

9. The roll of claim 1, wherein the heated fluid is a thermal oil.

10. The roll of claim 1, wherein the compressed fluid is an oil.

11. The roll of claim 1, wherein the heated fluid is a thermal oil and the compressed fluid is an oil other than thermal oil.

12. The roll of claim 1, wherein said source of heated fluid comprises a vessel and a pump which draws fluid from said vessel, said supplying means comprising a first conduit which delivers fluid from said pump to said at least one pocket and said source of heated fluid further comprising a heater in said first conduit, said source of compressed fluid comprising a second conduit which branches off said first conduit upstream of said heater and said at least one unit further comprising a third conduit which delivers fluid from said flow restrictor to said vessel.

13. The roll of claim 1, wherein each of said external and second surfaces extends axially and circumferentially of said shell and has a first length axially and a greater second length circumferentially of said shell.

14. The roll of claim 1, wherein said conveying means has an outlet which admits compressed fluid to said at least one plenum chamber and said flow restrictor has an inlet which receives fluid from said at least one plenum chamber, said inlet being remote from said outlet.

15. The roll of claim 1, wherein said at least one unit further comprises at least one fluid flow regulator in said at least one plenum chamber.

16. The roll of claim 15, wherein said at least one fluid flow regulator includes a nozzle which receives compressed fluid from said conveying means.

17. The roll of claim 1, wherein said at least one plenum chamber comprises a first portion in said bearing element and a second portion in said carrier.

18. The roll of claim 17, wherein said flow restrictor is provided on said carrier.

19. A roll comprising a carrier; a flexible rotary cylindrical shell spacedly surrounding said carrier and having an internal surface; and at least one hydrostatic displacing unit disposed between said carrier and said shell, said at least one unit comprising a bearing element having an external surface adjacent said internal surface and provided with at least one pocket, said element further having a second surface facing away from said external surface and said unit further comprising at least one plenum chamber disposed at said second surface and having a plurality of communicatively connected compartments, a source of pressurized heated fluid, means for supplying heated fluid from said source to said at least one pocket, a source of compressed fluid, means for conveying compressed fluid from the respective source to said at least one plenum chamber, said conveying means having an outlet which admits compressed fluid into one of said compartments, and a flow restrictor defining a path for evacuation of compressed fluid from said at least one plenum chamber, said flow restrictor having an inlet which receives fluid from another of said compartments and said inlet being remote from said outlet.

20. A roll comprising a carrier; a flexible rotary cylindrical shell spacedly surrounding said carrier and having an internal surface; and at least one hydrostatic displacing unit disposed between said carrier and said shell, said at least one unit comprising a bearing element having an external surface adjacent said internal surface and provided with at least one pocket, said element further having a second surface facing away from said external surface and said unit further comprising at least one plenum chamber disposed at said second surface and including a first portion in said bearing element and a second portion in said carrier, a source of pressurized heated fluid, means for supplying heated fluid from said source to said at least one pocket, a source of compressed fluid, means for conveying compressed fluid from the respective source to said at least one plenum chamber, and a flow restrictor provided on said carrier and defining a path for evacuation of compressed fluid from said at least one plenum chamber, said second portion of said at least one plenum chamber having an exposed side and said flow restrictor having an outlet in said exposed side.

21. The roll of claim 20, further comprising an evacuating conduit which receives fluid from said flow restrictor.

* * * * *